(12) United States Patent
De Bevilacqua et al.

(10) Patent No.: US 11,032,891 B2
(45) Date of Patent: Jun. 8, 2021

(54) METHOD FOR CONTROLLING A LIGHTING SYSTEM

(71) Applicant: ARTEMIDE S.p.A., Milan (IT)

(72) Inventors: Carlotta Francesca Isolina Maria De Bevilacqua, Milan (IT); Andrea Gallucci, Guanzate (IT); Roberto Franzosi, Milan (IT); Laura Pessoni, Milan (IT)

(73) Assignee: ARTEMIDE S.P.A., Milan (IT)

( * ) Notice: Subject to any disclaimer, the term of this patent is extended or adjusted under 35 U.S.C. 154(b) by 0 days.

(21) Appl. No.: 16/838,700

(22) Filed: Apr. 2, 2020

(65) Prior Publication Data
US 2020/0352002 A1    Nov. 5, 2020

(30) Foreign Application Priority Data
Apr. 5, 2019    (IT) .................. 102019000005218

(51) Int. Cl.
*H05B 47/11*    (2020.01)
*G01J 3/51*     (2006.01)

(52) U.S. Cl.
CPC .............. *H05B 47/11* (2020.01); *G01J 3/513* (2013.01)

(58) Field of Classification Search
None
See application file for complete search history.

(56) References Cited

U.S. PATENT DOCUMENTS

| 9,795,000 | B1 * | 10/2017 | Sooch | H05B 45/20 |
| 2010/0164387 | A1 * | 7/2010 | Shulz | G01J 3/513 315/151 |
| 2015/0359061 | A1 * | 12/2015 | Adler | H05B 45/22 315/153 |
| 2018/0077770 | A1 * | 3/2018 | Sooch | H05B 45/20 |

FOREIGN PATENT DOCUMENTS

| EP | 2796166 A1 * | 10/2014 | .......... A61B 5/4857 |
| EP | 2796166 A1 | 10/2014 | |

OTHER PUBLICATIONS

Italian Search Report and Written Opinion issued by Ministero dello Sviluppo Economico for Italian Application No. 201900005218, dated Oct. 21, 2019, pp. 1-8.

\* cited by examiner

*Primary Examiner* — Crystal L Hammond
(74) *Attorney, Agent, or Firm* — The Belles Group, P.C.

(57) ABSTRACT

A control method is provided for controlling a lighting system for automatically adjusting the colour temperature of the lighting system, by adjusting the colour temperature of the light emitted by the lighting system during one day according to a pre-set daily emission profile; the colour temperature emitted by the lighting system is progressively adjusted during the day according to a daily emission profile represented by a spline function consisting of a plurality of spline function portions corresponding to respective pre-set time periods; the daily emission profile is, moreover, modified based on a geographic position and, in particular, a latitude of the lighting system being controlled, as well as on the current date.

10 Claims, 4 Drawing Sheets

METHOD FOR CONTROLLING A LIGHTING SYSTEM

CROSS-REFERENCE TO RELATED APPLICATIONS

This patent application claims priority from Italian Patent Application No. 102019000005218 filed on Apr. 5, 2019, the entire disclosure of which is incorporated herein by reference.

TECHNICAL FIELD

This invention relates to a control method for controlling a lighting system.

BACKGROUND ART

There are known lighting systems provided with controllers that make it possible to automatically modify the photometric quantities of the emitted light (such as intensity, colour temperature, etc.), including according to environmental parameters, for example those detected by sensors, or according to pre-set programs.

However, the control logics, i.e. the programs controlling the lighting systems according to the prior art are not fully satisfactory, having, in particular, the drawback that the control of the lighting occurs according to pre-set parameters that do not take the local and current conditions into account.

In general, therefore, variations in lighting conditions controlled by prior art control methods may not correspond to the real needs of people living and working in those specific conditions.

In particular, it is known that during the day a daytime period or day (hours of light, i.e. exposure to sunlight) and a night-time period or night (hours of darkness) alternate.

The length of the day and night varies on earth according to the seasons and latitude: only at the equator do both day and night last 12 hours and this happens every day of the year.

At other latitudes, the day and night are only equal twice a year, at the equinoxes (spring equinox and autumn equinox). On the other days of the year, the length of the day and night changes from day to day: the length of the day increases between the winter solstice (when the length of the day is at its minimum) and the summer solstice (maximum length); and decreases between the summer solstice and the winter solstice.

In addition, the length of the day and night is different depending on the latitude where you are located.

As you move towards the north pole, the length of the day increases between the spring equinox and the autumn equinox, reaching its maximum at the summer solstice; and decreases between the autumn equinox and the spring equinox, reaching its minimum at the winter solstice.

On the other hand, moving towards the south pole, the effect is reversed, with the hours of the day increasing between the autumn equinox and the spring equinox, reaching its maximum at the winter solstice, and then decreasing again.

The polar circles (66° latitude N and 66° latitude S) are the two latitudes at which the sun shines at midnight at least once a year.

In contrast, in the winter months between September and March in the northern hemisphere and in the summer months between March and September in the southern hemisphere, there is at least one day of absolute darkness in those regions (the sun does not rise).

The life of those living at such latitudes is strongly influenced by these effects.

On the other hand, all human beings live according to circadian rhythms that regulate psychological and physiological aspects.

In general, circadian rhythms are linked to the light-dark cycle and are influenced by light, mainly by natural light.

However, these days many people live and work most of their days in rooms with artificial lighting. In general, artificial lighting is not designed and regulated to support circadian rhythms.

On the other hand, different people follow different rhythms, so different people can be particularly active in different parts of the day, as well as requiring rest at different times from other people.

Automatic control methods for lighting systems, in accordance with the prior art, generally do not make it possible to adapt the lighting conditions to the specific time and place in which you are located, nor to the specific characteristics of individual people.

DISCLOSURE OF INVENTION

One purpose of this invention is to provide a method for controlling a lighting system that makes it possible to overcome the drawbacks of the prior art described herein.

In particular, it is one purpose of the invention to provide a control method that makes it possible to automatically adjust the lighting conditions, and, specifically, the colour temperature (and any other lighting parameters), taking into account the specific place and time, and, thus, the day of the year, and the geographic position (specifically, the latitude), in which it operates.

This invention therefore relates to a control method for controlling a lighting system as defined in the appended claim 1.

Additional preferred features of the invention are defined in the dependent claims.

In accordance with the invention, the artificial light generated by a lighting system (that can comprise one or more lighting apparatuses), is controlled so as to support the daily activity rhythms in natural conditions of time and place. In particular, the control method of the invention controls the lighting system so as to provide a colour temperature corresponding to the state of light and darkness of a given place at a specific time. Optionally, the control method also controls other parameters of the light emitted from the lighting system, such as its intensity.

Over the course of one day, the lighting (light emitted by a generic lighting system controlled in accordance with the invention) is adjusted according to a pre-set daily emission profile: the colour temperature emitted by the lighting system progressively changes over time, according to a purpose-built spline function, composed of several spline function portions corresponding to respective time periods.

In each period, the colour temperature monotonically changes (increases or decreases).

More specifically, the colour temperature progressively increases or decreases between a plurality of nodes with a trend that supports the natural circadian rhythms. Periods in which the colour temperature progressively increases alternative with periods in which the colour temperature progressively decreases.

Higher colour temperatures (colder light) favour activity, while lower colour temperatures (warmer light) favour relaxation.

In accordance with the invention, the daily emission profile (colour temperature varying by time) is not, however, the same, but changes from day to day (based, thus, on the date) and also according to the geographic position, in particular the latitude.

In particular, the control method of the invention controls the lighting system so as to provide a colour temperature corresponding to the state of the light and darkness of a given place on a specific day.

The control of the lighting occurs, thus, according not only to the time of day (according to a daily emission profile) but also according to geographic position (in particular, latitude) and date (and, thus, season).

The daily emission profile is determined by using a spline function specific to a given day of the year and a given latitude.

Once a date and place have been fixed, the lighting system will be controlled so as to emit light according to a spline function specific to that date and place (latitude).

As days pass, if the user and the lighting system being controlled remain in the same place, the lighting only changes according to the date, and the daily emission profile progressively changes, adapting itself to the different length of the day and night periods of the day (hours of light/darkness). The general trend (form) of the spline function remains basically the same from one day to the next.

If, on the other hand, the user moves, arriving at a place that is located at a different latitude, a different latitude will be acquired and the lighting system (which will, clearly, be a local lighting system, acquired on the spot and thus different to the lighting system previously being controlled) will be controlled with a daily emission profile modified according to the new latitude (to which, in general, a different length of light and dark periods corresponds).

The control method of the invention operates, therefore, in activating pre-set logics and programs that vary the colour temperature over time, differently according to the place and day of the year in which it is located.

The control method, in accordance with the invention, includes, in fact, a geolocation step in which the position of the lighting system being controlled is acquired; and a step for acquiring the current date.

Based on the data acquired on the position on the earth (in particular, latitude) and on the data, the control method of the invention includes a step for selecting a daily emission profile specific to the position (latitude) and the data acquired.

The lighting system is, as a result, controlled via a daily emission profile that represents a profile of variations in colour temperature (and, optionally, other lighting parameters, in particular, intensity) specially designed for that precise place and that precise date.

In accordance with the invention, the functions that determine the variation over time of the colour temperature (taking geographic place and day of the year into account) are spline functions.

A spline function is a function for interpolating a set of predefined points (nodes) and is composed of a set of polynomials linked to each other, the purpose of which is to interpolate the nodes in a period, so that the function is continuous at least until a given order of derivatives at every point of the period.

Specifically, the control method of the invention uses spline functions that can be defined as follows:

in a Cartesian reference plane that includes the time as abscissa (horizontal axis) and the colour temperature as ordinate (vertical axis), the coordinates of two nodes being defined, for example N1(h1,T1) and N2(h2,T2), the spline function between the two nodes is given by the parametric equations:

$$x(u)=F1(u)*h1+F2(u)*h2+F3(u)*\cos x(N1)*K0+F4(u)*\cos x(N2)*K1$$

$$y(u)=F1(u)*T1+F2(u)*T2+F3(u)*\cos y(N1)*K0+F4(u)*\cos y(N2)*K1$$

where:
$F1(u)=2*u^3-3*u^2+1$
$F2(u)=-2*u^3+3*u^2$
$F3(u)=u^3-2*u^2+u$
$F4(u)=u^3-u^2$
with $0<u<1$
cos x(N1), cos y(N1)=tangent vector inclination in N1
cos x(N2), cos y(N2)=tangent vector inclination in N2
K0,K1=torsion constants that define the more or less rounded shape of the spline function at the nodes.

In particular, the spline function is constructed as follows:
defining a Cartesian reference plane having the time as abscissa (horizontal axis) and the colour temperature as ordinate (vertical axis);
selecting n times ($h_1, h_2, \ldots H_n$), for example n=5, spaced apart from one another, during the day and defining respective time periods between one time and the next;
assigning to each time a value of colour temperature, thus defining respective n nodes in the Cartesian reference plane that has the time as abscissa (horizontal axis) and the colour temperature as ordinate (vertical axis); each node is defined by one of said n times and by the value of the colour temperature assigned to that time;
interpolating the nodes by means of a spline function, assigning to each period a spline function portion.

The general form of the spline function is regulated by the position of the nodes.

For a certain reference date, a first group of nodes is selected with which the spline function is constructed corresponding to the daily emission profile for the reference date.

The daily emission profiles for the other days, for the same place (thus, at the same latitude), are obtained by varying the position of the nodes along the abscissa axis, and, specifically, by applying corrective parameters to each node, in particular to each value of time, and by obtaining, thus, a new spline function for that day.

As already highlighted, the control method of the invention does not operate using just one spline function that controls the lighting system each day and in any place, but uses spline functions that are specific to each day of the year and to each latitude.

The spline function, which represents the variation of the colour temperature during the course of the day, changes, thus, according to the day of the year and the geographic position (latitude). In particular, the spline function expands according to the latitude and day, according, thus, to the daylight hours (length of the day) as programmed.

More specifically, the control method of the invention includes the following steps:
acquiring a datum representative of the geographic position, in particular of the latitude, where the lighting system to be controlled is located;
acquiring a datum representative of the current date;
assigning to each node coordinates (representative of the time and colour temperature) depending on the acquired data of position and date and hence specific to the acquired position and date;

determining a specific spline function that provides a spline interpolation of the nodes;

controlling the operation of the lighting system to adjust the colour temperature over time according to the specific spline function.

The spline function specific to the date and position (latitude) acquired is obtained, for example, from a reference spline function, by applying corrective parameters to the nodes and, in particular, to each value of time, and thus obtaining a new spline function for that day and for that latitude.

At night, the colour temperature remains constant at the minimum value (warmer light that favours relaxation).

It is also possible to define a plurality of user-patterns, which represent respective typical behaviour patterns.

The user-patterns are characterised by different nodes. In particular, the user-patterns have the nodes (one or more nodes) placed in a different position on the time-colour temperature reference plane. Each user-pattern may differ from the others depending on the time assigned to one or more nodes (i.e. due to the position of the nodes along the abscissa axis) and/or on the colour temperature associated with one or more nodes (position of the nodes on the ordinate axis).

The spline function is calibrated based on the specific selected user-pattern.

For example, a "standard" user-pattern, which is representative of an average person; a "rooster" user-pattern, for a person particularly active in the morning; and an "owl" user-pattern, for a person particular active in the evening can be defined, and so on.

For example, in comparison to the spline function for the "standard" user-pattern, the "rooster" user-pattern spline function is shifted to the left on the colour temperature-time of day graph; while, for the "owl" user-pattern, the spline function is shifted towards the right.

The colour temperatures always remain between a minimum colour temperature Tmin (for example: Tmin=2700K) and a maximum colour temperature Tmax (for example: Tmax=4500K). Optionally, it is possible to modify the pre-set values of Tmin and Tmax so that the control method calculates the spline functions as a result.

It is also possible to assign the user the possibility of directly intervening on the nodes, modifying the times and/or corresponding colour temperatures.

The control method of the invention is compatible with any lighting system formed from one or more apparatuses with light sources capable of varying the colour temperature (tunable white, RGB, RGBW, RWB lamps, etc.).

It is also possible to intervene on the intensity of the individual apparatus and/or of the lighting system as a whole, in addition to on the colour temperature.

It is possible to control individual apparatuses as well as groups thereof.

Conveniently, the control method of the invention is implemented via an application installed on a portable device, such as a smartphone.

In one variant, the control method also takes the local weather conditions, which influence quality and quantity of external light, into account.

The control method comprises the additional steps of:

acquiring (e.g. by accessing a weather service via the internet) representative data of a local weather situation in your location;

adjusting the parameters of the emission profile so as to compensate for variations with respect to the acquired data on weather conditions.

BRIEF DESCRIPTION OF THE DRAWINGS

Examples of emission profiles calculated according to the control method of the invention are shown in the attached figures, wherein.

BEST MODE FOR CARRYING OUT THE INVENTION

Figure 1:
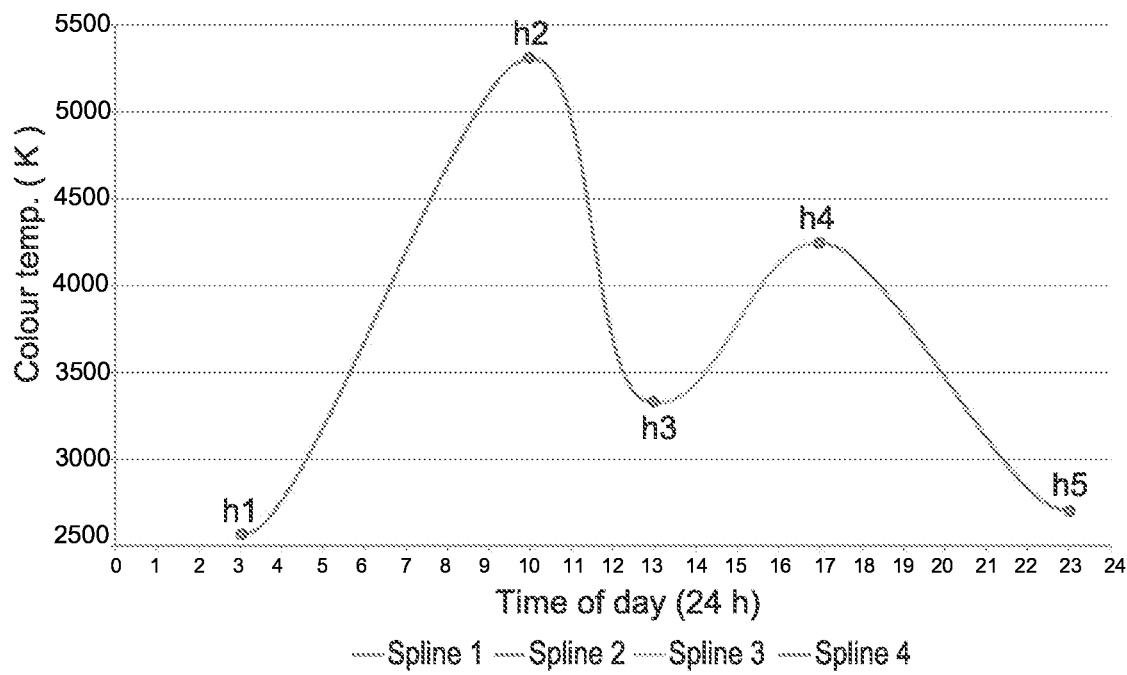
FIG. 1 is a colour temperature-time graph representing a first daily emission profile for a generic date and a generic latitude.
Figure 2:
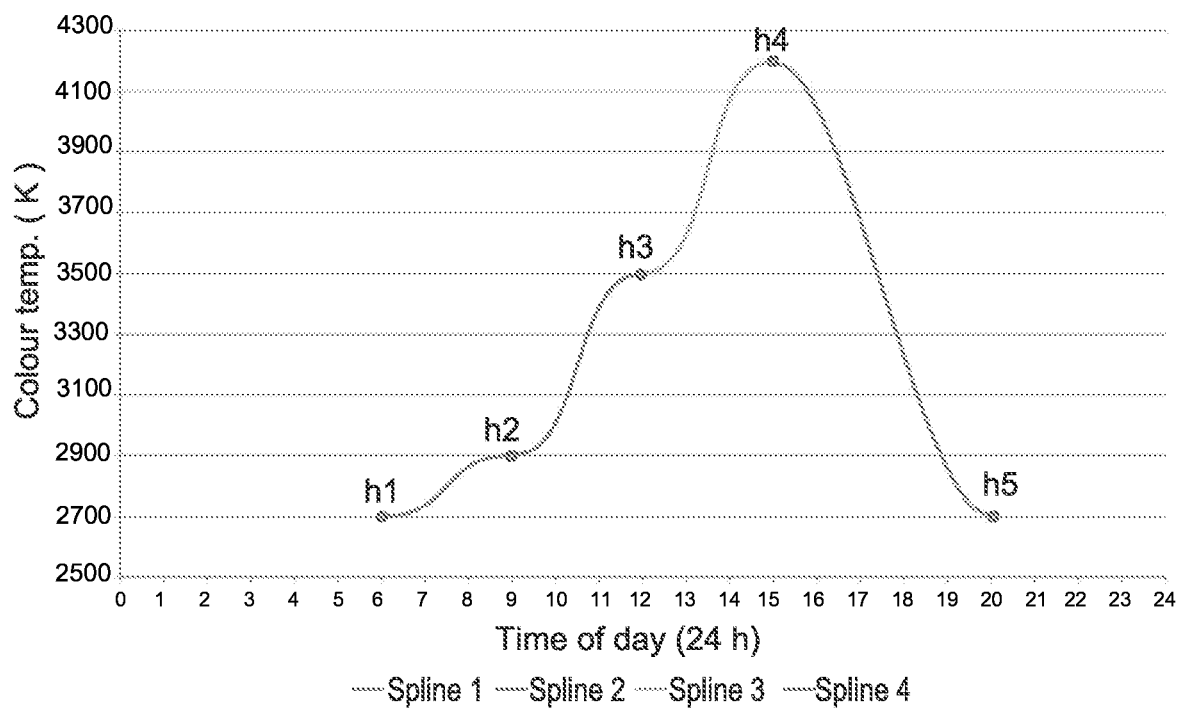
FIG. 2 is a colour temperature-time graph representing a second daily emission profile for a generic date and a generic latitude.
Figure 3:
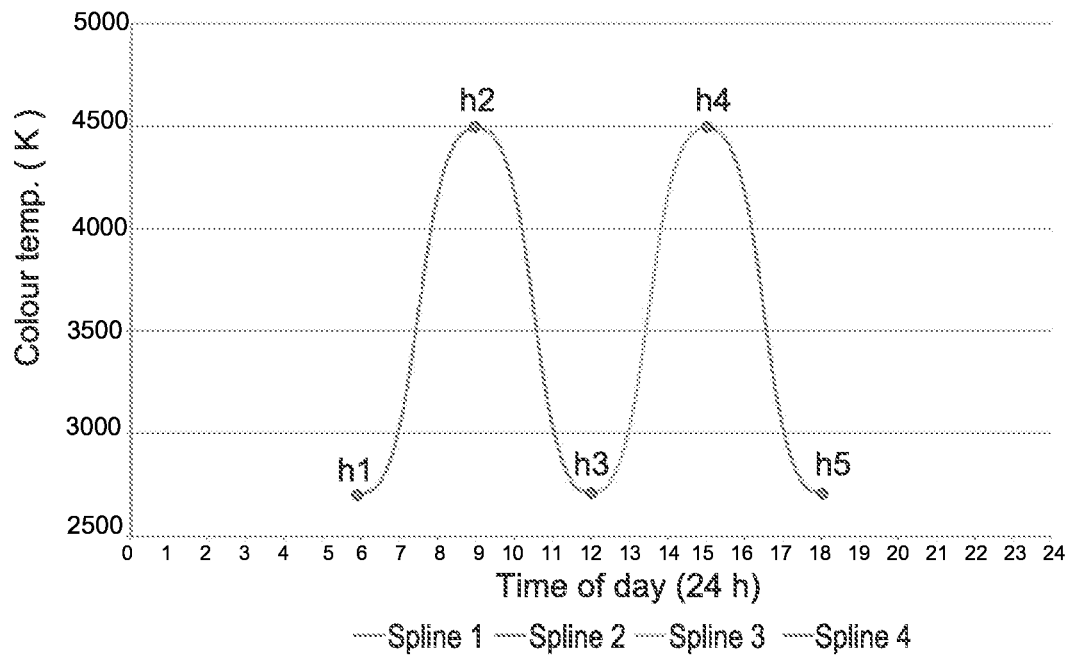
FIG. 3 is a colour temperature-time graph representing a third daily emission profile for the spring equinox date at any latitude.
Figure 4:
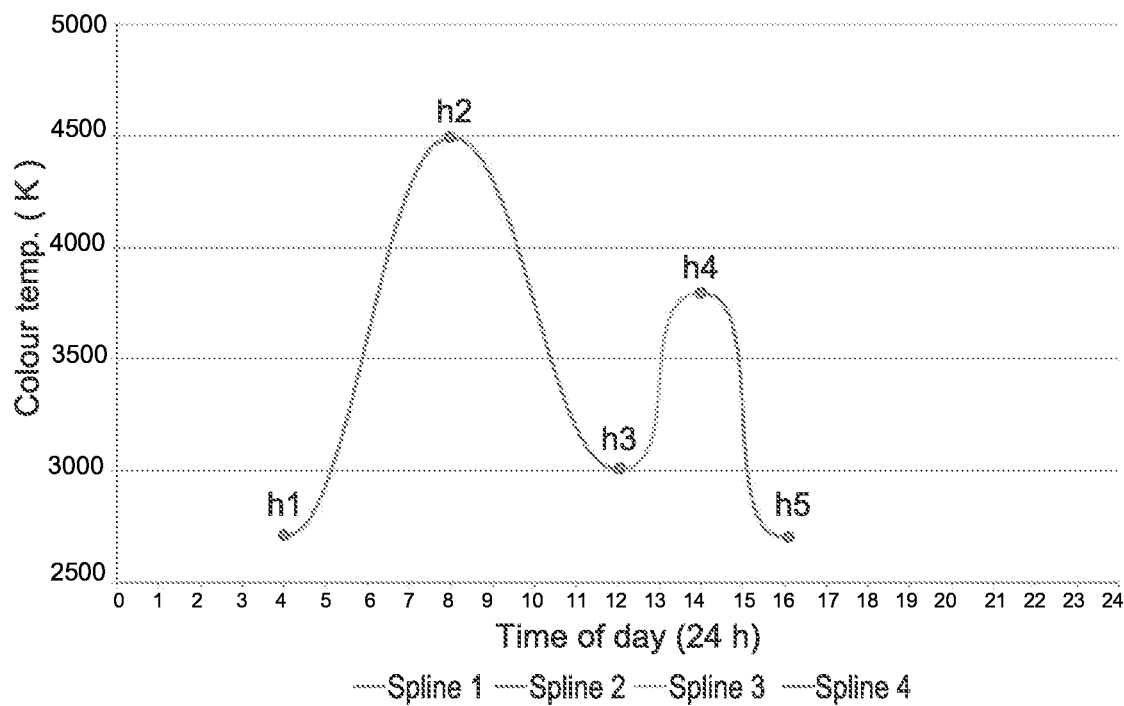
FIG. 4 is a colour temperature-time graph representing a fourth daily emission profile for a "rooster" user-pattern for the date of the spring equinox at latitude 45 N.
Figure 5:
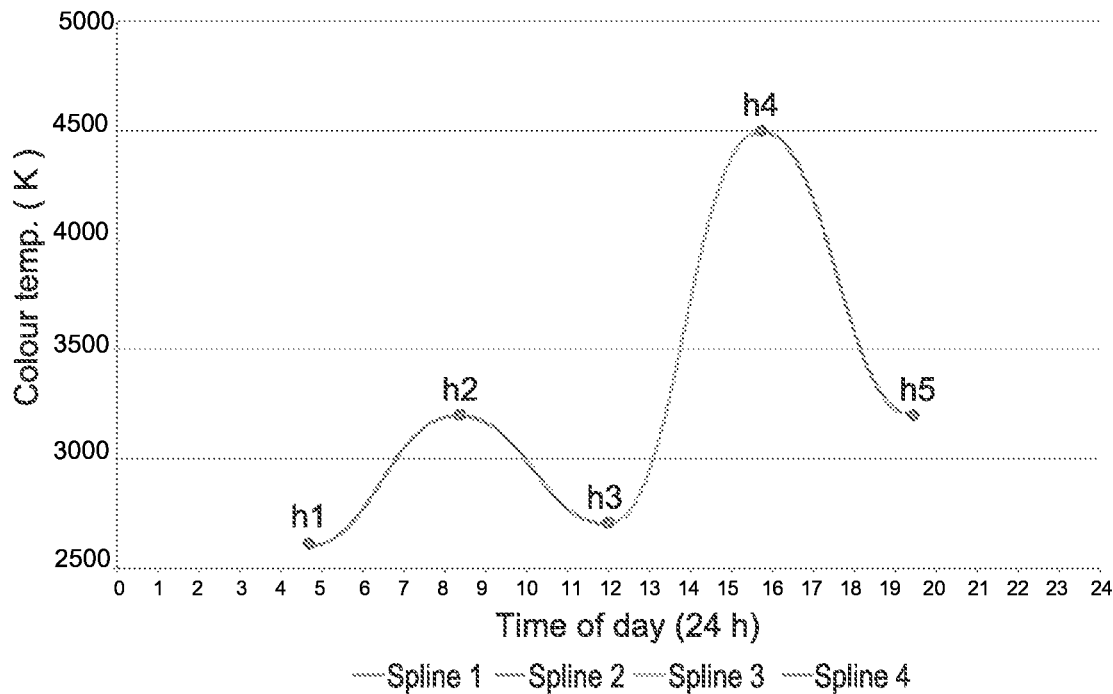
FIG. 5 is a colour temperature-time graph representing a fifth daily emission profile for an "owl" user-pattern for the date of the summer solstice at latitude 45 N.
Figure 6:
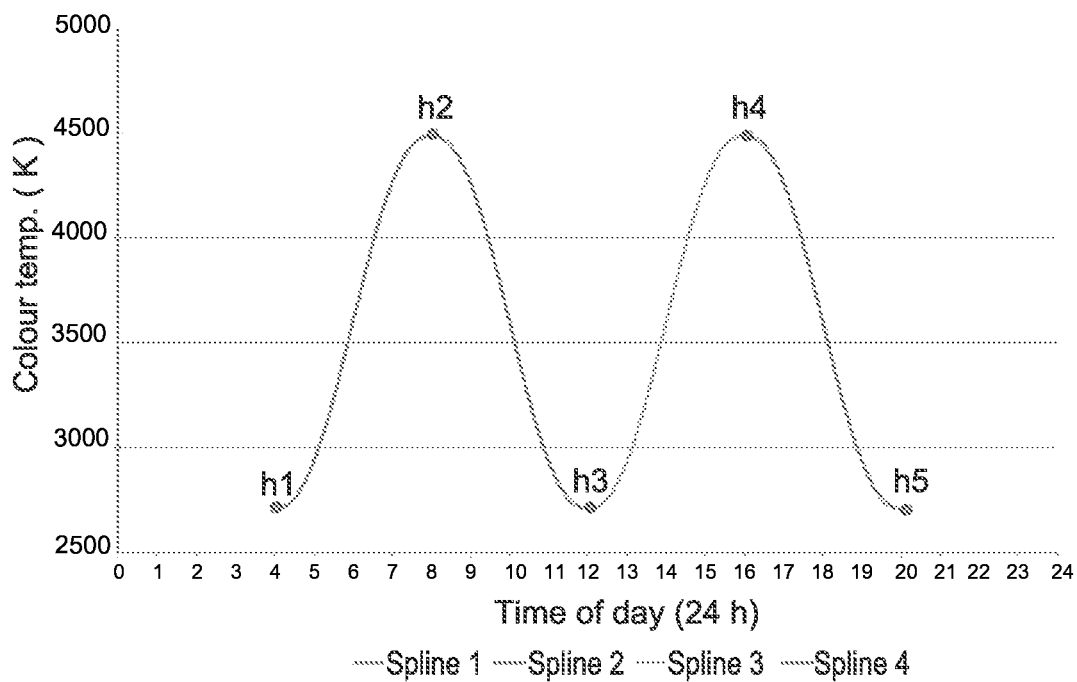
FIG. 6 is a colour temperature-time graph representing a sixth daily emission profile for a "standard" user-pattern for the date of the summer solstice at the latitude of the Arctic Circle.
Figure 7:
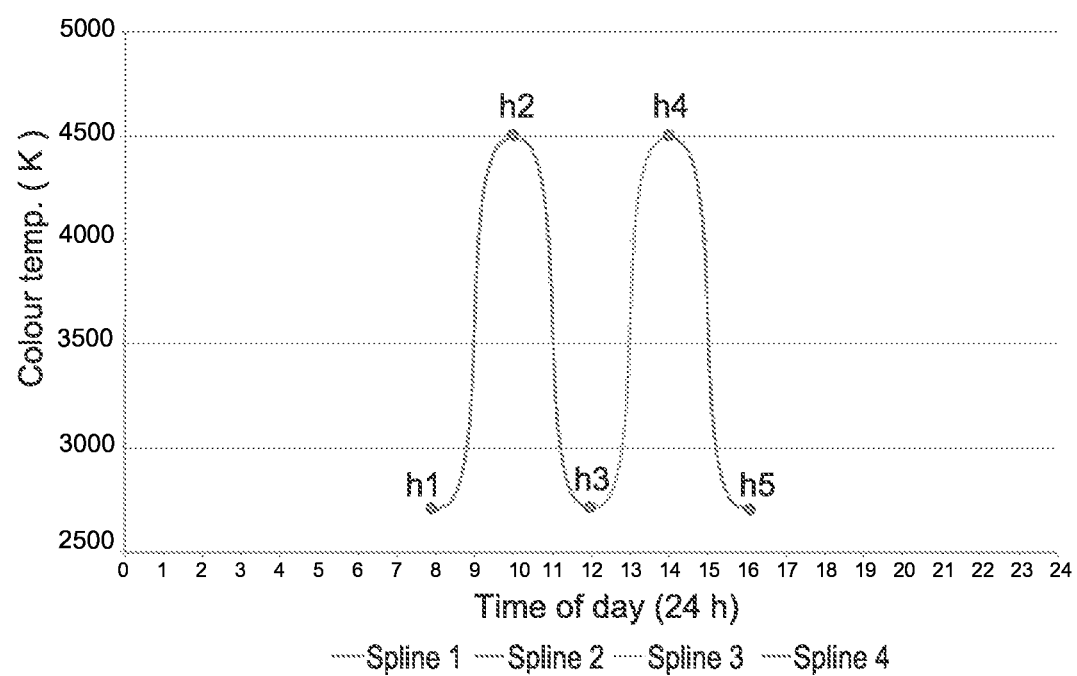
FIG. 7 is a colour temperature-time graph representing a seventh daily emission profile for a "standard" user-pattern for the date of the winter solstice at the latitude of the Arctic Circle.

The control method of the invention can be applied to a generic lighting system that can be of various kinds and can comprise one or more different lighting apparatuses.

In general, the lighting system controlled according to the invention comprises at least one lighting apparatus having one of more light sources (for example, LED sources) that can emit light with variable colour temperatures between a minimum colour temperature Tmin and a maximum colour temperature Tmax.

Lastly, it is understood that the method for controlling a lighting system as described and illustrated herein can be subject to additional modifications and variations that do not depart from the scope of the accompanying claims.

The invention claimed is:

1. A control method for controlling a lighting system and automatically adjusting the colour temperature of the lighting system, comprising:

adjusting the colour temperature of the light emitted by the lighting system during one day according to a pre-set daily emission profile; wherein the colour temperature of the light emitted by the lighting system is progressively adjusted during the day according to a daily emission profile represented by a spline function comprising a plurality of spline function portions corresponding to respective pre-set time periods;

wherein the method further comprises acquiring a latitude of the controlled lighting system; acquiring a current date; and changing the daily emission profile depending on the acquired latitude and date; and wherein the daily emission profile is determined by using a spline function specific for a certain day of the year and for a certain latitude.

2. A control method according to claim 1, wherein in each period the colour temperature monotonically increases or decreases.

3. A control method according to claim 1, comprising constructing the spline function in the following steps:
defining a Cartesian reference plane having the time as on an abscissa axis, and the colour temperature on an ordinate axis;
selecting n times (h1, h2, . . . hn), spaced from one another, during the day and defined by respective time periods between the times;
assigning to each time a value of colour temperature, thus defining respective n nodes in the time-colour temperature reference plane; each node being defined by one of said n times and by the value of the colour temperature assigned to that time;
interpolating the nodes by means of a spline function, assigning to each time period a spline function portion.

4. A control method according to claim 1, comprising:
selecting a first group of nodes for a reference date, and constructing the spline function corresponding to the daily emission profile for the reference date;
calculating daily emission profiles for other days, at the same latitude, by changing the position of the nodes along the abscissa axis, and, precisely, by applying corrective parameters to each node to each value of time, and thus obtaining a new spline function.

5. A control method according to claim 1, comprising:
acquiring a datum representative of the geographic position of the latitude of the lighting system to control;
acquiring a datum representative of the current date;
assigning to each node coordinates, representative of the time and the colour temperature, depending on the acquired data of position and date and hence specific to the acquired position and date;
determining a specific spline function that provides a spline interpolation of the nodes;
controlling the operation of the lighting system to adjust the colour temperature over time according to the specific spline function.

6. A control method according to claim 1, wherein the specific spline function calculated according to the acquired position and date is obtained from a reference spline function, by applying corrective parameters to the nodes of the reference spline function and, in particular, to each value of time of the nodes.

7. A control method according to claim 1, comprising defining a plurality of user-patterns, representing respective typical behaviour patterns and characterised by nodes positioned in respective positions on the time-colour temperature reference plane; the user-patterns being different from one another according to the time assigned to one or more nodes along the abscissa axis, and/or the colour temperature associated to one or more nodes along the ordinate axis; the spline function being calibrated to a selected user-pattern.

8. A control method according to claim 1, wherein the colour temperatures are always maintained between a pre-set minimum colour temperature (Tmin), for example 2700K, and a pre-set maximum colour temperature (Tmax), for example 4500K.

9. A control method according to claim 1, comprising modifying the values of the pre-set minimum colour temperature and the pre-set maximum colour temperature so that the spline functions are calculated by using selected values of the minimum colour temperature and the maximum colour temperature.

10. A control method according to claim 1, comprising modifying the position of one or more nodes on the time-colour temperature reference plane, so that the spline functions are calculated by using nodes selected by a user.

* * * * *